United States Patent
Pedrini (10) Patent No.: US 11,071,291 B2
(45) Date of Patent: Jul. 27, 2021

(54) RIG UNIT FOR A FISHING LINE

(71) Applicant: Fabio Pedrini, Casalecchio di Reno (IT)

(72) Inventor: Fabio Pedrini, Casalecchio di Reno (IT)

( * ) Notice: Subject to any disclaimer, the term of this patent is extended or adjusted under 35 U.S.C. 154(b) by 210 days.

(21) Appl. No.: 16/308,716

(22) PCT Filed: Jun. 12, 2017

(86) PCT No.: PCT/IB2017/053459
§ 371 (c)(1),
(2) Date: Dec. 10, 2018

(87) PCT Pub. No.: WO2017/216701
PCT Pub. Date: Dec. 21, 2017

(65) Prior Publication Data
US 2019/0150419 A1   May 23, 2019

(30) Foreign Application Priority Data
Jun. 13, 2016  (IT) .................. 102016000060595

(51) Int. Cl.
*A01K 91/06*  (2006.01)
*A01K 93/00*  (2006.01)
(Continued)

(52) U.S. Cl.
CPC ............. *A01K 91/06* (2013.01); *A01K 83/06* (2013.01); *A01K 93/00* (2013.01); *A01K 95/00* (2013.01); *A01K 97/02* (2013.01)

(58) Field of Classification Search
CPC ........ A01K 93/00; A01K 95/00; A01K 91/00; A01K 91/06; A01K 97/00; A01K 97/02
(Continued)

(56) References Cited

U.S. PATENT DOCUMENTS 2,572,790 A * 10/1951 West ..................... A01K 93/00
  43/44.92
2,792,663 A *  5/1957 Sinclair ................. A01K 83/00
  43/43.15
(Continued)

FOREIGN PATENT DOCUMENTS

CA      492739 A     5/1953
DE   29508418 U1 *  9/1995  ............. A01K 97/02
(Continued)

OTHER PUBLICATIONS

International Search Report and Written Opinion of the International Searching Authority for PCT/IB2017/053459 dated Oct. 25, 2017.

*Primary Examiner* — Darren W Ark
*Assistant Examiner* — Katelyn T Truong
(74) *Attorney, Agent, or Firm* — Heslin Rothenberg Farley & Mesiti P.C.; Victor A. Cardona, Esq.

(57) ABSTRACT

A rig unit for a fishing line includes a float body and a ballast mass removably coupled to the float body. The ballast mass and the float body are configured to remain coupled together during a launch phase and a flight, and to separate from each other upon impact with the water at the end of a flight path. During flight, when the float body and the ballast mass are connected together, the rig unit is orientated with the float body arranged in front, and the ballast mass arranged behind it. After separation upon impact with the water, the ballast mass is configured to rest on the seabed. The main line has a first section descending from the fishing rod to a guide passage of the ballast mass, and a second section ascending from the guide passage to the float body, which is able to remain immersed, at a distance from the water surface, with a terminal line extending upwards, starting from the float body, to an auxiliary float with which the hook is associated.

14 Claims, 7 Drawing Sheets

(51) Int. Cl.
  *A01K 95/00* (2006.01)
  *A01K 97/02* (2006.01)
  *A01K 83/06* (2006.01)

(58) Field of Classification Search
  USPC .......... 43/41, 41.2, 43.1, 43.15, 44.87, 44.9,
                                         43/44.91, 44.99
  See application file for complete search history.

(56) References Cited

U.S. PATENT DOCUMENTS

| | | | | |
|---|---|---|---|---|
| 3,180,051 A * | 4/1965 | Freeman | ................ | A01K 95/00 |
| | | | | 43/43.12 |
| 3,218,751 A * | 11/1965 | Walker | ................... | A01K 95/00 |
| | | | | 43/43.11 |
| 3,800,461 A * | 4/1974 | Jacobi | .................... | A01K 93/00 |
| | | | | 43/44.88 |
| 3,803,749 A * | 4/1974 | Boyum | .................. | A01K 95/00 |
| | | | | 43/44.9 |
| 3,897,649 A * | 8/1975 | Jorgensen | .............. | A01K 91/06 |
| | | | | 43/43.15 |
| 4,051,620 A * | 10/1977 | Yasuda | ................. | A01K 93/00 |
| | | | | 43/44.99 |
| 5,131,183 A * | 7/1992 | Thayer | ................ | A01K 91/053 |
| | | | | 43/41 |
| 6,094,853 A | 8/2000 | Lim | | |
| 3,230,659 A1 | 1/2016 | Coiling | | |
| 2006/0137238 A1* | 6/2006 | Corbitt | ................... | A01K 95/00 |
| | | | | 43/44.87 |
| 2006/0265937 A1* | 11/2006 | Randall | .................. | A01K 95/00 |
| | | | | 43/43.15 |
| 2007/0180758 A1* | 8/2007 | Patton | .................... | A01K 95/00 |
| | | | | 43/44.92 |
| 2009/0094880 A1* | 4/2009 | Gifford | ................. | A01K 95/02 |
| | | | | 43/43.1 |
| 2011/0041381 A1 | 2/2011 | Houghton | | |

FOREIGN PATENT DOCUMENTS

| | | | | | |
|---|---|---|---|---|---|
| EP | 0035996 | B1 | | 1/1984 | |
| EP | 0951827 | A1 * | 10/1999 | ............ | A01K 95/00 |
| EP | 2244564 | A1 * | 11/2010 | ............ | A01K 97/02 |
| GA | 2688443 | A1 * | 7/2011 | ............ | A01K 97/01 |
| GB | 2019181 | A | | 4/1979 | |
| GB | 2282739 | A * | 4/1995 | ............ | A01K 93/00 |
| GB | 2284336 | A * | 6/1995 | ............ | A01K 95/00 |
| GB | 2405070 | A * | 2/2005 | ............ | A01K 97/02 |
| GB | 2448075 | A * | 10/2008 | ............ | A01K 97/02 |
| GB | 2451874 | A * | 2/2009 | ............ | A01K 97/02 |
| GB | 2456085 | A * | 7/2009 | ............ | A01K 97/02 |
| GB | 2459930 | A * | 11/2009 | ............ | A01K 97/02 |
| GB | 2470346 | A * | 11/2010 | ............ | A01K 91/20 |
| GB | 2477095 | A * | 7/2011 | ............ | A01K 97/02 |
| GB | 2484973 | A * | 5/2012 | ............ | A01K 97/02 |
| GB | 2487098 | A * | 7/2012 | ............ | A01K 93/00 |
| GB | 2518832 | A * | 4/2015 | ............ | A01K 91/20 |
| GB | 2536732 | A * | 9/2016 | ............ | A01K 91/06 |
| JP | S59675 | U | | 1/1984 | |
| JP | 02097347 | A * | 4/1990 | | |
| JP | 03004727 | A * | 1/1991 | | |
| JP | 04346738 | A * | 12/1992 | | |
| JP | H0555879 | U * | 7/1993 | ............ | A01K 97/02 |
| JP | H0560280 | U * | 8/1993 | | |
| JP | H0595280 | U * | 12/1993 | | |
| JP | 07313032 | A * | 12/1995 | | |
| JP | 08089146 | A * | 4/1996 | | |
| JP | 08163944 | A * | 6/1996 | | |
| JP | 09121737 | A * | 5/1997 | | |
| JP | 2623477 | B2 * | 6/1997 | | |
| JP | 2624628 | B2 * | 6/1997 | | |
| JP | H09238604 | A | | 9/1997 | |
| JP | 10286049 | A * | 10/1998 | ............ | A01K 93/00 |
| JP | 11169042 | A * | 6/1999 | | |
| JP | 2000209995 | A * | 8/2000 | | |
| JP | 2001190197 | A * | 7/2001 | | |
| JP | 2002315487 | A * | 10/2002 | | |
| JP | 2002315488 | A * | 10/2002 | | |
| JP | 3401701 | B1 * | 4/2003 | | |
| JP | 2003125684 | A * | 5/2003 | | |
| JP | 2003284476 | A * | 10/2003 | | |
| JP | 2003289775 | A * | 10/2003 | | |
| JP | 2003310120 | A * | 11/2003 | | |
| JP | 2004141137 | A * | 5/2004 | | |
| JP | 2004173702 | A * | 6/2004 | | |
| JP | 2004337138 | A * | 12/2004 | | |
| JP | 2005328820 | A * | 12/2005 | | |
| JP | 3802542 | B2 * | 7/2006 | ............ | A01K 91/06 |
| JP | 3813977 | B1 * | 8/2006 | | |
| JP | 2006217858 | A * | 8/2006 | .......... | C07D 307/52 |
| JP | 2007014302 | A * | 1/2007 | ............ | A01K 95/00 |
| JP | 2007014317 | A * | 1/2007 | | |
| JP | 2007117028 | A * | 5/2007 | | |
| JP | 2008173110 | A * | 7/2008 | ............ | A01K 95/00 |
| JP | 4236803 | B2 * | 3/2009 | | |
| JP | 2011155899 | A * | 8/2011 | | |
| JP | 2012090622 | A * | 5/2012 | | |
| JP | 2012157247 | A * | 8/2012 | | |
| JP | 2012217406 | A * | 11/2012 | | |
| JP | 6137905 | B2 * | 5/2017 | | |
| WO | WO-0182691 | A1 * | 11/2001 | ............ | A01K 97/02 |
| WO | WO-2018162349 | A1 * | 9/2018 | ............ | A01K 93/02 |

* cited by examiner

RIG UNIT FOR A FISHING LINE

CROSS REFERENCE TO RELATED APPLICATIONS

This application is a national stage filing under section 371 of International Application No. PCT/IB2017/053459, filed on Jun. 12, 2017, published in English on Dec. 21, 2017 as WO2017/216701A1, and claims priority to Italian Application No. 102016000060595, filed on Jun. 13, 2016. The entire disclosures of each application are hereby incorporated herein by reference.

FIELD OF THE INVENTION

The present invention relates to a rig unit for a fishing line, including a float body with which a ballast mass is associated. The invention relates, in particular, to a rig unit of the type including:

a float body, having a main axis, a front end, with reference to the orientation in flight, and a rear end, and a ballast mass, removably coupled to the float body, wherein the ballast mass and the float body are configured to remain coupled together during the launch phase and flight, and to separate from each other upon impact with the water at the end of the flight path.

PRIOR ART

Float units of the type indicated above are described, for example, in documents U.S. Pat. No. 6,094,853 A, EP 0 035 996 A1, US 2011/041381 A1, and U.S. Pat. No. 3,230,659 A.

OBJECT OF THE INVENTION

The object of the present invention is to produce a rig unit for a fishing line by which launches, even very long launches, can be easily carried out with reduced or even no risk of entanglement of the fishing line.

A further object of the invention is to propose a rig unit of the type indicated above, in which the risk of detachment of the float body from the ballast mass during flight is minimized, and in which the risk of non-detachment of these elements upon impact with the water is minimized.

A further object of the invention is to propose a rig unit that makes it possible to adopt a particularly efficient fishing technique.

A further object of the invention is that of producing a rig unit that has a simple and inexpensive structure.

Yet another object of the invention is to produce a rig unit that is extremely easy to use.

SUMMARY OF THE INVENTION

In view of achieving the aforesaid objects, the present invention relates to a rig unit having the characteristics indicated at the beginning of this description and further characterized in that:

the ballast mass has a front end removably coupled to said rear end of the float body, and a rear end provided with a guide passage for a main line connected to the float body, said rig unit has an attachment element for connecting a terminal line having a head connected to the float body and an opposite head carrying an auxiliary float with which a hook can be associated, in such a way that during flight, when said float body and said ballast mass are coupled together, said rig unit is orientated with the float body arranged in front, and the ballast mass arranged behind it, while after said float body and said ballast mass are separated upon impact with the water at the end of the flight path, the ballast mass is configured to rest on the seabed, so that the main line is provided with a first section descending from the fishing rod until the aforesaid guide passage of the ballast mass, and with a second section ascending from said guide passage of the ballast mass until said float body, with said float body that, in this way, is able to remain immersed, at a distance from the water surface, and with the terminal line arranged in such a way as to extend upwards, starting from said float body, until said auxiliary float.

In a preferred embodiment, the float body and the ballast mass are coupled together in a removable manner by means of magnetic coupling means. For example, the magnetic coupling means can comprise one or more permanent magnets associated with the ballast mass and one or more ferromagnetic elements associated with the float body. For example, the ferromagnetic element is shaped as a conical element protruding from the rear end of the float body, while the front end of the ballast mass has a conical seat for receiving therein the conical element of ferromagnetic material, provided with one or more permanent magnets (M).

In the preferred embodiment, the float body is shaped as a solid of revolution, and the ballast mass has a radial cut, which allows decoupling of the ballast mass from the float body without interfering with the main line connected to the float body.

Still with reference to the preferred embodiment, the ballast mass is provided with a rod extending from the rear end of the ballast mass and having a tail end opposite to the ballast mass, which carries an eyelet constituting the said guide passage for the main line.

Thanks to the characteristics indicated above, the rig unit according to the invention allows launches to be easily carried out, including very long launches without the risk of entangling the line. During flight, the float body remains in front of the ballast mass, and is dynamically driven by the ballast mass, which minimizes the risk of detachment. Being arranged in front during flight, the float body is the first to undergo impact with the water and therefore tends to separate immediately from the heavier ballast mass, which pushes behind it. After detachment, the ballast mass moves downwards in the direction of the bottom of the fishing dock, therefore moving away from the float body, which is instead called towards the surface. The distancing of the float body with respect to the ballast mass is facilitated by the sliding of the main line through aforesaid guide passage. When the ballast mass reaches the seabed, the main line has a section descending from the fishing rod until the guide passage of the ballast mass, and a section ascending from the guide passage of the ballast mass until the float body. The float body remains immersed, at a distance from the water surface, and the terminal line is arranged so as to extend upwards, starting from the float body until said auxiliary float, which acts as a bait and has the hook associated with it. Accordingly, in the rig unit according to the invention, the float body has the function of keeping the main line stretched once the ballast mass has been placed on the bottom. In this condition, acting on the reel of the fishing rod, the fisherman can arrange the float body and, therefore, also the hook at different depths, to find the most suitable depth for fishing. In this way, fishing can be made extremely effective.

The structure and arrangement described above minimize the risk of entangling the line during flight. The rig unit described above is simple and economic to construct and is also extremely easy to use.

In a variant, the float body defines a bait-carrying compartment within which the hook with the bait connected to the terminal line remains sheltered during flight, and then comes out upon impact with the water. There is also a variation wherein the float body is in the form of an openable basket that can be filled with odorous bait, suitable for creating a luring scent for bait fish or predatory fish.

DETAILED DESCRIPTION OF SOME EMBODIMENTS

The invention will now be described with reference to the attached drawings, provided purely by way of non-limiting example, wherein.

Figure 1:
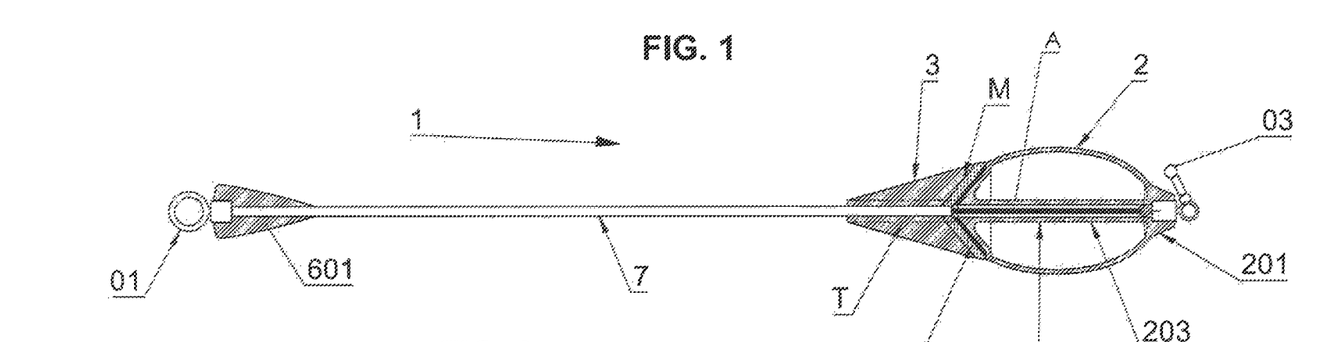
FIG. 1 is a longitudinal cross-sectional view of a rig unit according to a preferred embodiment of the present invention.
Figure 2:
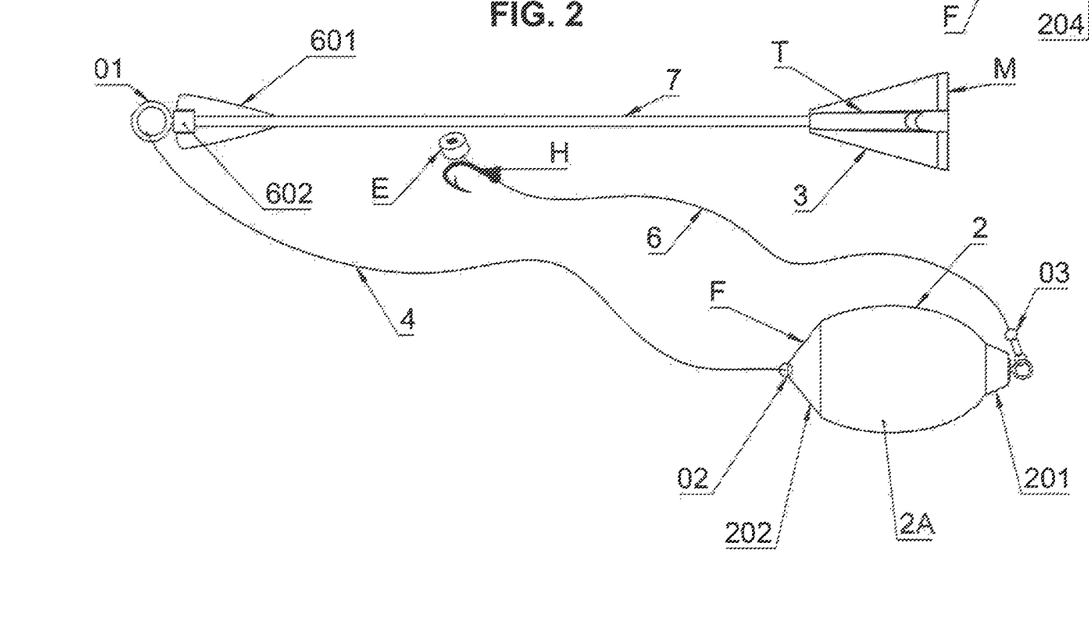
FIG. 2 is a view of the components of the unit of FIG. 1 in the uncoupled state.
Figure 2A:
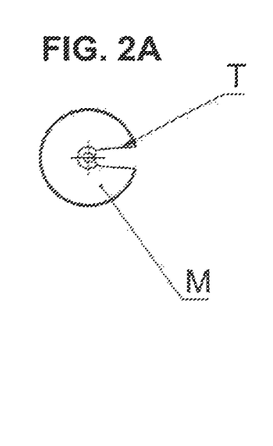
FIG. 2A is an end view of the ballast mass forming part of the rig unit according to the invention, FIGS. 3 and 4 schematically show the flight step and the final immersed condition of the rig unit according to the invention.
Figure 3:
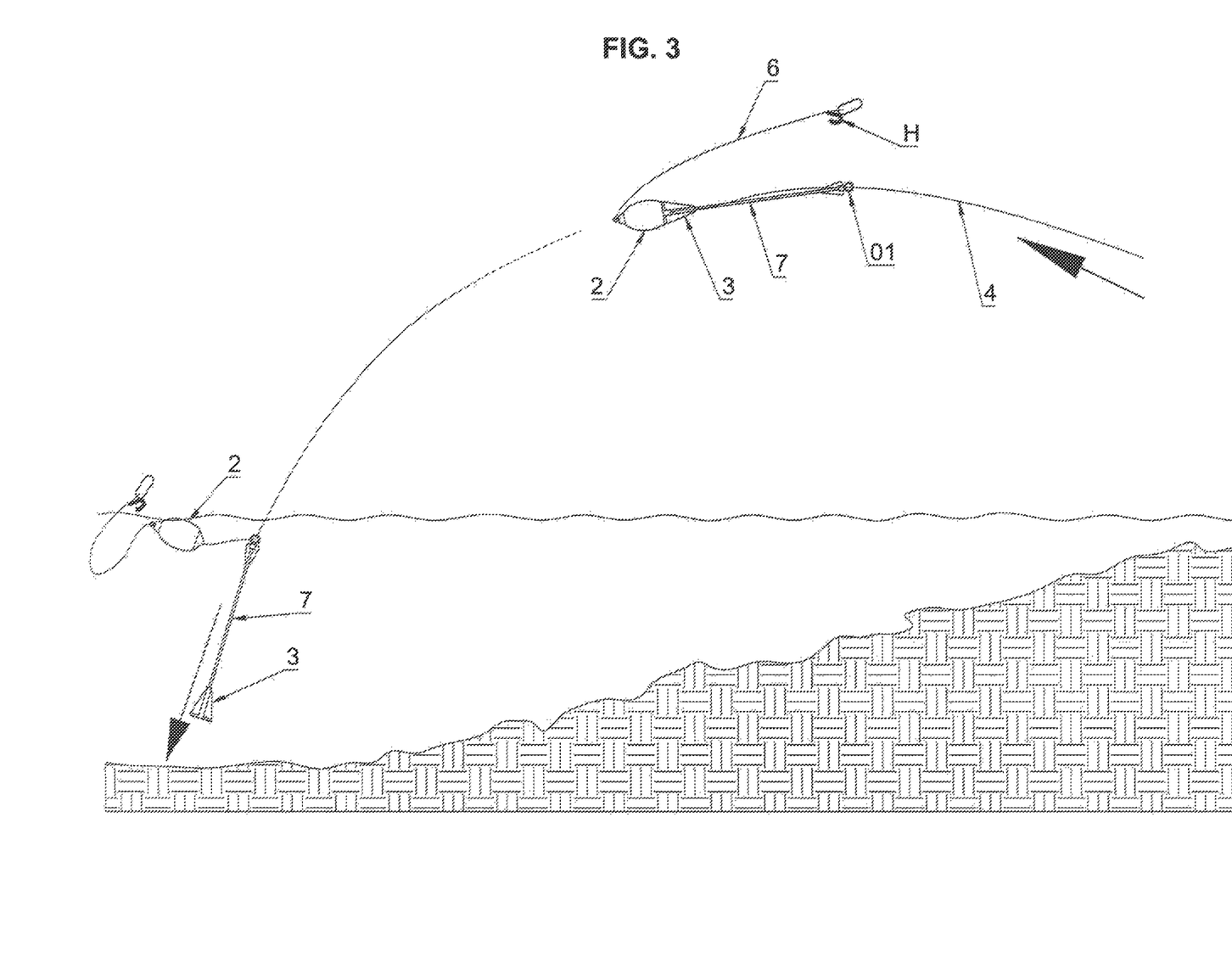

With reference to FIGS. 1 to 3, numeral 1 indicates, in its entirety, a rig unit according to a first embodiment of the present invention. The unit 1 comprises a float body 2 and a ballast mass 3, which remains coupled to the float body 2 during flying in the air following a launch. A main line 4 is connected to the float body 2, as will be illustrated in greater detail below.

The float body 2 can be produced in a single piece or even in multiple elements (as will be illustrated with reference to further embodiment examples). In any case, the structure and constitution of the float body 2 can be produced in any known way. The material of the float body 2 can also be any suitable material, as already known to those skilled in the art, for example plastic material, in particular polyurethane, or balsa etc.

The float body 2 is shaped as a solid of revolution, with a main axis 2A (see FIG. 2), a front end (with reference to the orientation during flight) indicated with 201 and a rear end 202. The ballast mass 3 has a front end coupled to the rear end of the float body. The arrangement is such that, during flight, the float body is positioned in front and the ballast mass is positioned behind it.

In the embodiments illustrated herein, the rear end of the float body 2 and the front end of the ballast mass 3 remain coupled to each other during the launch phase and flight, by means of magnetic coupling means. Specifically, in the examples illustrated herein, the coupling means between the float body 2 and the ballast mass 3 comprise a ferromagnetic element F rigidly connected to the rear end 202 of the float body 2 and a permanent magnet M rigidly connected to the ballast mass 3. In the illustrated example, the ferromagnetic element F has a conical conformation, and the permanent magnet M has a conical-wall conformation, defining a cavity that receives therein the ferromagnetic element F in the coupled condition.

As can be seen in FIGS. 2 and 3, the entire body of the ballast mass 3 has a radial cut T that allows the decoupling of the ballast mass 3 from the float body 2 without interfering with the main line 4, which is connected to the float body 2. In the embodiment illustrated, the magnet M, which is associated with the ballast mass, also has a radial cut in a position corresponding to that of the cut T.

The permanent magnet M is chosen in such a way that the magnetic attraction force is sufficiently high to maintain the coupled condition during flight, and sufficiently low to ensure that the impact with the water at the end of the flight causes decoupling. This result can easily be achieved by experimenting with float and ballast mass samples.

As can be seen in FIG. 1, the float body 2 is axially crossed by a passage 203 within which, with the interposition of a tube 204, a stem A is placed, whose opposite ends come out of the float body 2 in plastic material. The tube 204 can also be omitted and/or defined by the same body as the float 2 (as in the embodiment of FIG. 5).

Figure 4:
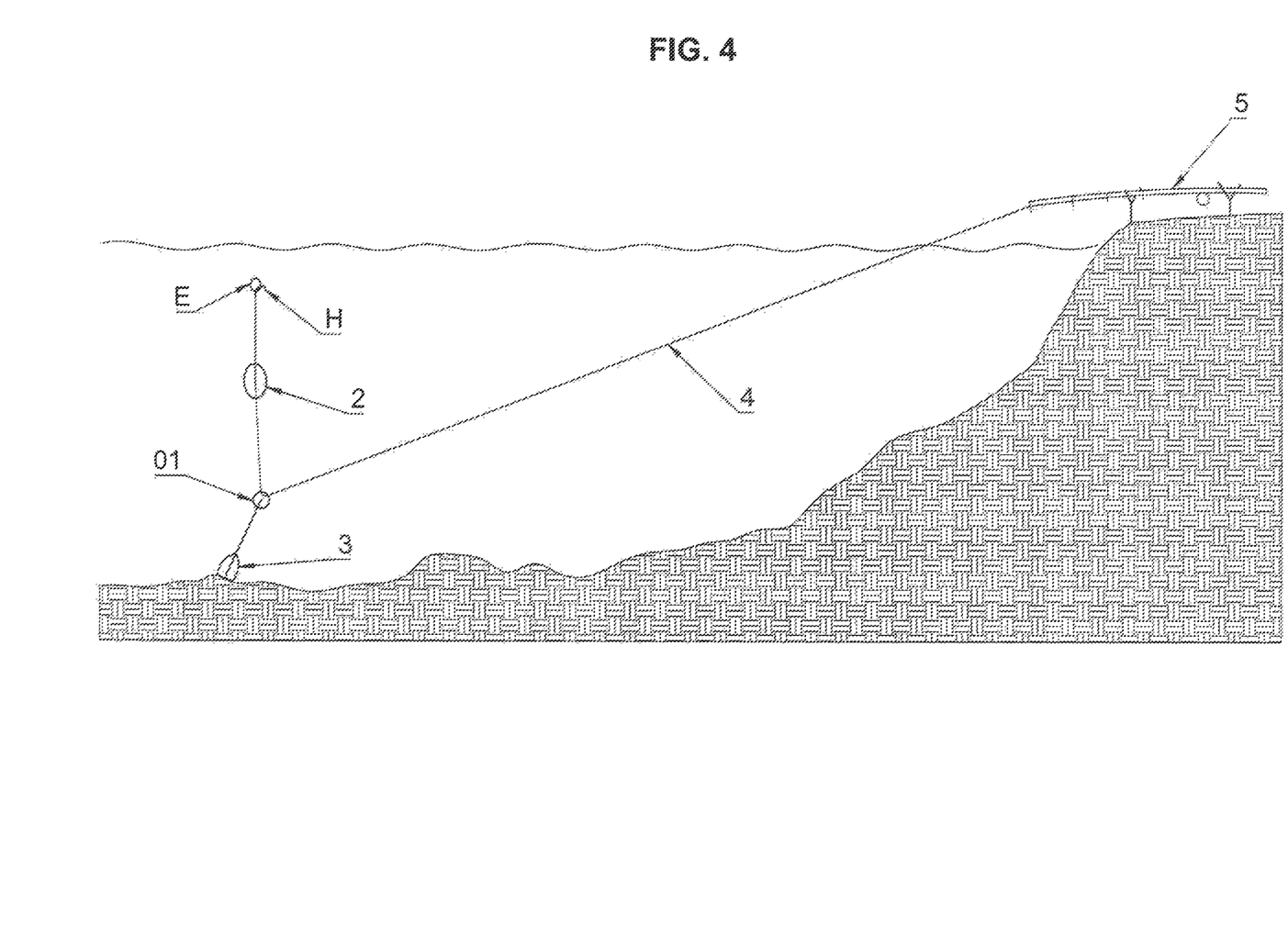

In the solution of FIGS. 1 and 2, the rear end of the stem A carries an eyelet O2, which is secured to the head of the main line 4, the opposite end thereof being associated with a fishing rod 5 (see FIG. 4). The front end of the stem A carries a floating shank ending with an eyelet O3, which secures a head of a terminal line 6 carrying a hook H and a bait E at its opposite end, constituting an auxiliary float (see FIGS. 2 and 4).

Returning to the ballast mass 3, this can be configured and formed in any known manner, using any suitable material, as is well known to those skilled in the art. In the embodiment illustrated herein, the ballast mass 3 has an essentially conical body with a hollow front end surface, within which the permanent magnet M is secured. The rear end of the ballast mass 3 extends into a rod 7, permanently connected to the body of the ballast mass 3. The rod 7 can be made of, for example, metal or plastic material, and has a tail end 601 having two diametrically opposed wings designed to prevent the main line 4 twisting around the rod 7 during flight. The tail end 601 of the rod 7 carries a guide passage for the main line 4. In the illustrated example, this guide passage is formed of an eyelet O1, through which the main line 4 is free to slide (see FIG. 2). The eyelet O1 is carried by a pin projecting axially from the tail end 601 of the rod 7 and mounted in a freely rotatable manner about its axis within a cylindrical body 602 carried by the tail end 601.

In the embodiment of FIGS. 1-3, the eyelet O3 is mounted on a freely-floating shank protruding from the front end 201 of the float body 2.

FIG. 3 shows (with exaggerated proportions for clarity) the rig unit according to the invention both during flight and immediately after impact with the water. During flight, the float body 2 and the ballast mass 3, with the rod 7, remain coupled together, thanks to the magnetic attraction between the permanent magnet M and the ferromagnetic element F. In this coupled condition, the aerodynamic conformation of the rig unit and its weight allow a long range, without the risk of entangling the line. During flight, the float body remains in front of the ballast mass, and is dynamically driven by the ballast mass, which minimizes the risk of detachment. Being arranged in front during flight, the float body 2 is the first to undergo impact with the water and therefore tends to separate immediately from the heavier ballast mass 3, which pushes behind it. After detaching, the ballast mass 3 moves downwards away from the float body 2 thanks to the possibility of sliding of the line 4 through the eyelet O1, to reach the condition illustrated in FIG. 4.

Figure 5:
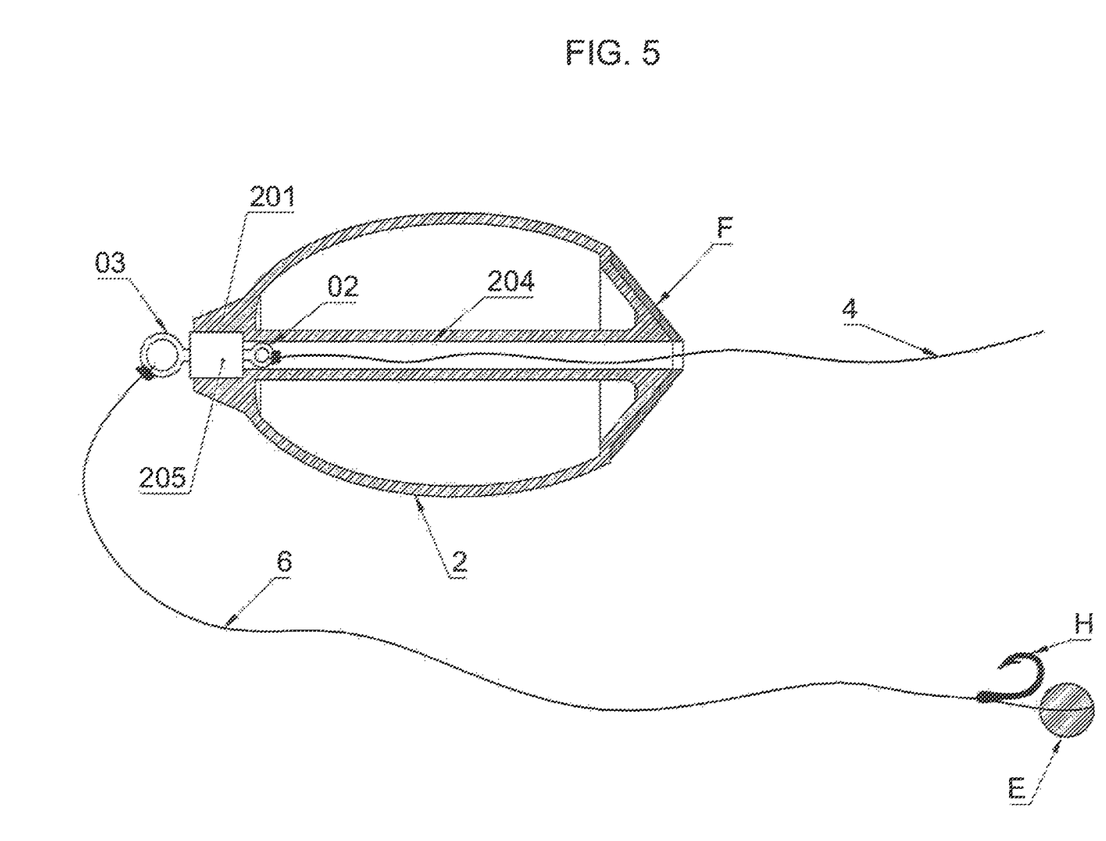
FIG. 5 shows a variant of the rig unit according to the invention.

FIG. 5 is a cross-sectional view of a rig unit according to a variant, which differs from the solution of FIG. 1 in that the axial tube 204 is formed in a single piece with the float body 2, and in that the stem A is not provided. In this case, within the axial passage 204 adjacent to the front end 201 of the float body 2, a support body is received, for example in the form of a cylindrical block 205. The eyelet O3, for connecting the terminal line 6, is carried by a freely rotatable pin mounted within the cylindrical block 205, while the eyelet O2 for securing the main line 4 is carried by a pin connected to the block 205.

Figure 6:
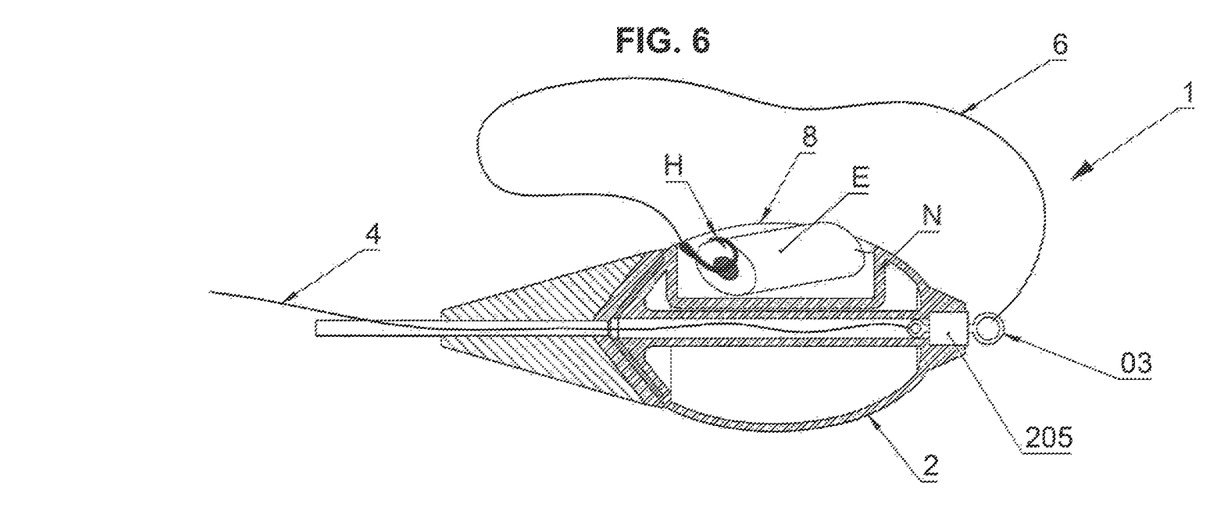
FIGS. 6 and 7 are a cross-sectional view and a perspective view of another variant.
Figure 7:
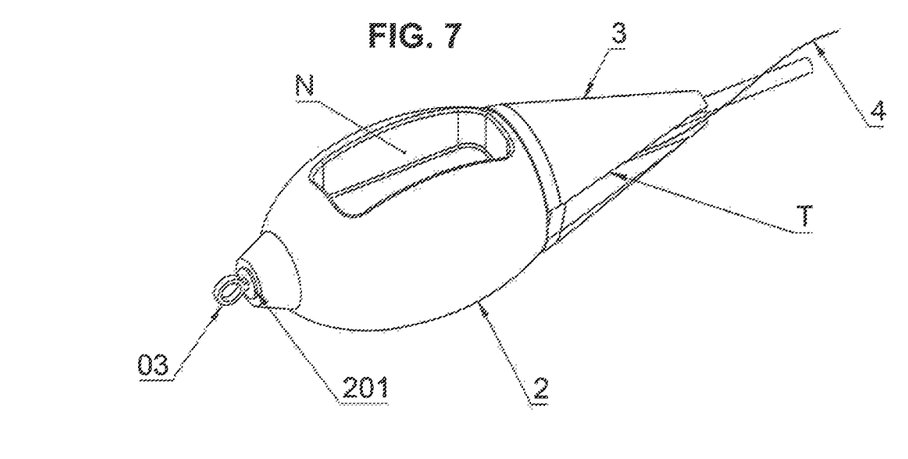

FIGS. 6 and 7 illustrate a variant of the solution of FIG. 5, wherein the float body 2 defines a compartment N receiving the hook H and the bait E connected to the terminal line 6. Hook H and bait E are retained within the seat N during flight by any retention element, for example, by a tape or thread 8 (for example, of synthetic material). This solution further reduces the risk of entanglement of the lines 4 and 6 during flight. Upon impact with the water, hook H and bait E come out of the compartment N.

Figure 8:
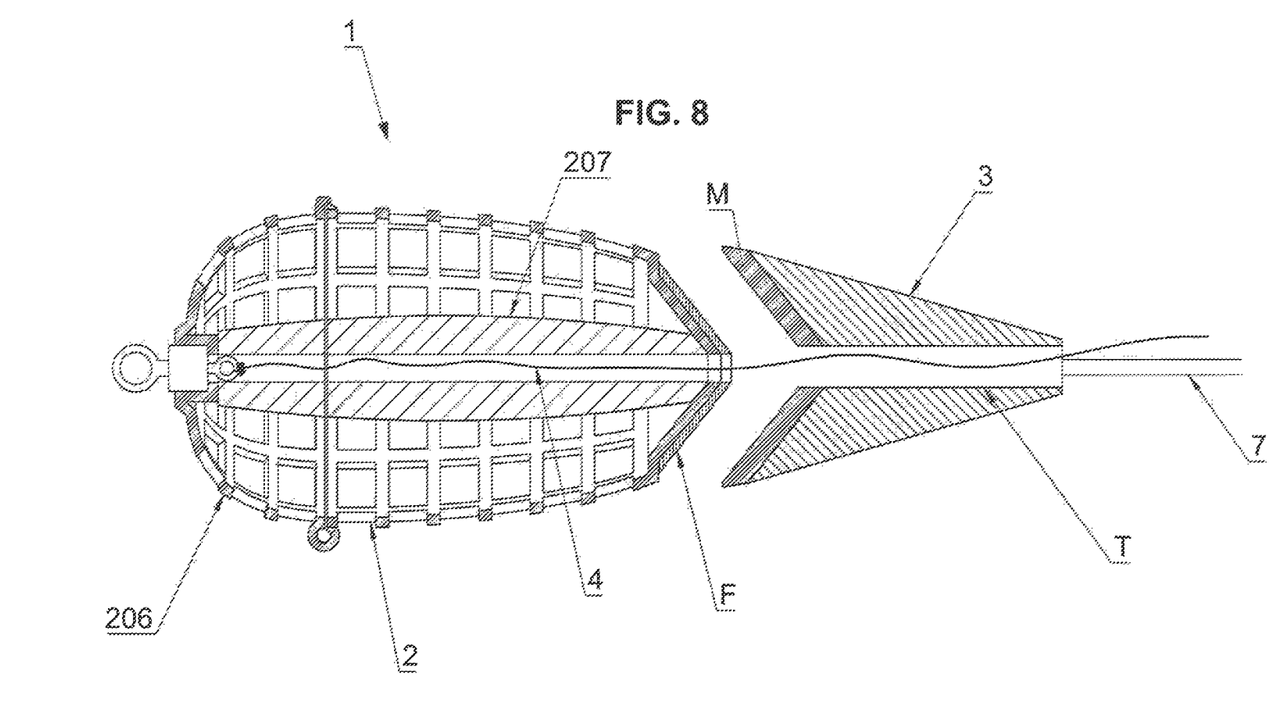
FIG. 8 is a cross-sectional view of an additional variant.

Finally, FIG. 8 shows a further variation wherein the float body 2 is in the form of a hollow basket, with a rear main portion and an openable front cover 206, defining the front part of the float body. In this case, however, the basket body includes a central part 207 defining the passage for the main line 4.

In all the variants described above, the cut T, which is formed in both the ballast mass 3 body and the permanent magnet M, allows the ballast mass 3 to separate from the float body 2 upon impact with the water without interfering with the main line 4. Furthermore, the conical element of ferromagnetic material F has a central hole for the passage of the main line.

Thanks to the above-described features, the rig unit according to the invention can facilitate the execution of very long launches, without any risk of entangling the line.

Figures 9, 10:
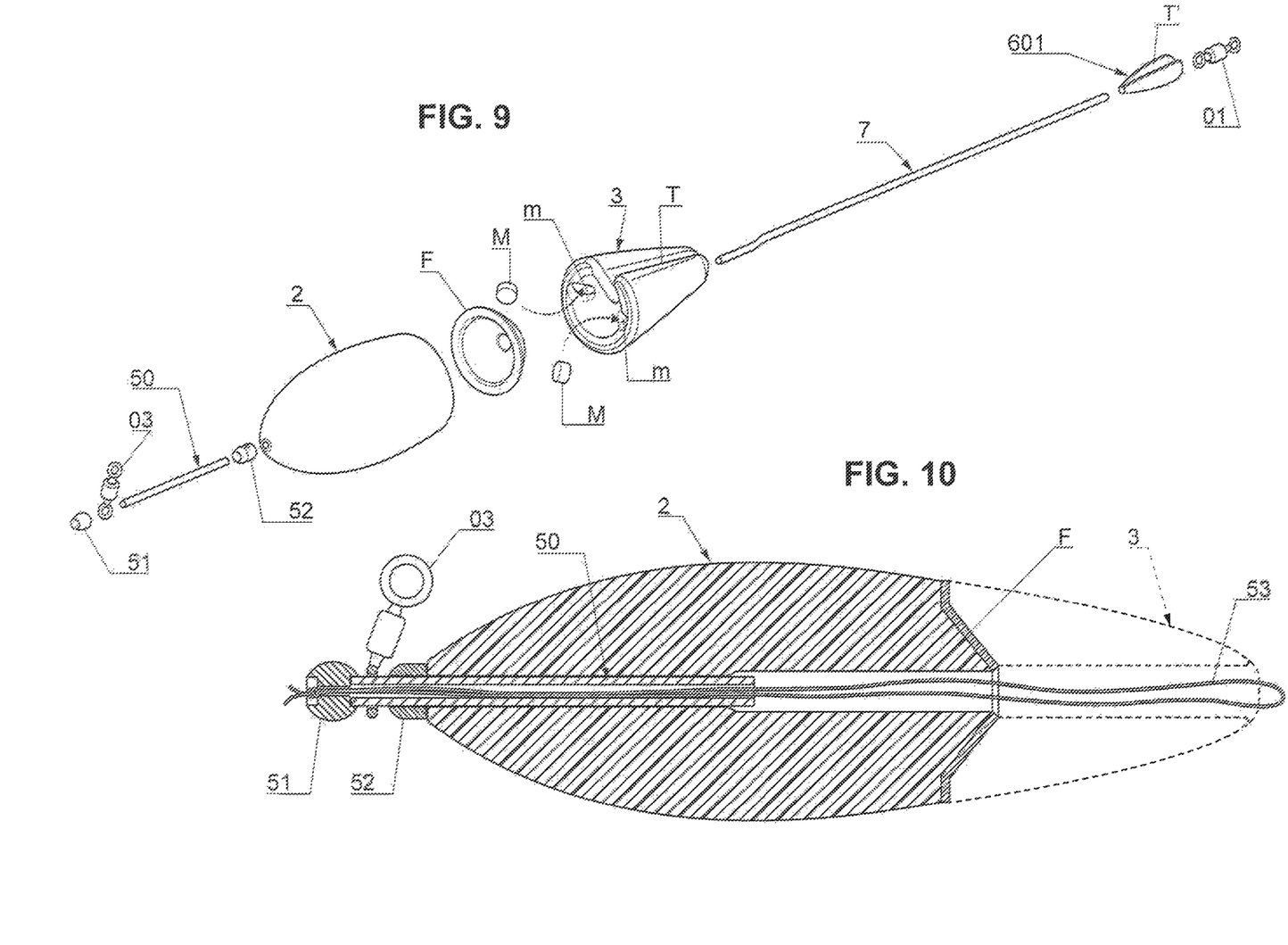
FIGS. 9 and 10 are an exploded perspective view and a partial cross-sectional view of a further embodiment example.

FIGS. 9 and 10 show a variant of the preferred embodiment of the invention. In these figures, the parts common to the preceding figures are indicated by the same references. Compared to the solution of FIG. 1, the main differences are as follows:

two small permanent magnets M are provided, received in seats "m" on the hollow conical surface at the front end of the ballast mass 3;

the tail end 601 of the rod 7 is shaped as a solid of revolution, with a cut or guide passage T' angularly in phase with the cut T of the ballast mass 3. The main line 4 is guided through the cut T and the cut T', so that during flight, the main line 4 cannot twist around the rod 7;

the float body 2 is crossed by a tube 50 having an end protruding from the front end of the float body 2; on this protruding portion, an eyelet of a shank is freely rotatable, whose opposite end carries the eyelet O3; this component is retained axially on the tube 50 between two bodies 51, 52;

as can be seen in FIG. 10, a knotted thread 53 forms a protruding loop from the rear end of the ballast mass, to act as an eyelet O2 for connecting the main line 4.

Of course, without prejudice to the principle of the invention, the details of construction and the embodiments may vary widely with respect to those described and illustrated purely by way of example, without departing from the scope of the present invention.

For example, instead of the magnetic coupling means, the float body 2 and the ballast mass 3 could remain coupled during flight due to a mechanical coupling between reciprocal engagement elements, with a coupling force sufficiently low to ensure that the impact with the water causes disengagement.

The invention claimed is:

1. A rig unit for a fishing line, including:
   a float body, having a main axis, a front end, with reference to an orientation in flight, and a rear end, and
   a ballast mass, removably coupled to the float body,
   wherein the ballast mass and the float body are configured to remain coupled together during a launch phase and a flight, and to separate from each other upon impact with water at an end of a flight path,
   the ballast mass having a front end removably coupled to said rear end of the float body, and a rear end connected to a guide rod having a guide passage for a main line connected to the float body,
   an attachment element for connecting a terminal line having a head connected to the float body and an opposite head carrying an auxiliary float with which a hook can be associated,
   in such a way that during flight, when said float body and said ballast mass are connected together, said rig unit is orientated with the float body arranged in front, and the ballast mass arranged behind said float body while after said float body and said ballast mass are separated upon impact with the water at the end of the flight path, the ballast mass is configured to rest on a seabed, so that the main line is provided with a first section descending from the fishing rod to the guide passage of the guide rod and with a second section ascending from said guide passage of the ballast mass to said float body, with said float body able to remain immersed, at a distance from a water surface, and with the terminal line arranged in such a way as to extend upwards, starting from said float body, to said auxiliary float.

2. The rig unit according to claim 1, wherein the float body and the ballast mass are removably coupled together by magnetic coupling means.

3. The rig unit according to claim 2, wherein the magnetic coupling means comprise one or more permanent magnets associated with the ballast mass and one or more ferromagnetic elements associated with the float body.

4. The rig unit according to claim 3, wherein the one or more ferromagnetic elements is shaped as a conical element protruding from the rear end of the float body, a front end of the ballast mass having a conical seat for receiving therein a conical element of the one or more ferromagnetic elements, the conical seat comprising the one or more permanent magnets.

5. The rig unit according to claim 1, wherein the float body is shaped as a solid of revolution, and in that the ballast mass has a radial cut, which allows decoupling of the ballast mass from the float body without interfering with the main line connected to the float body.

6. The rig unit according to claim 5, wherein the guide rod extends from the rear end of the ballast mass and has a tail end, opposite to the ballast mass, said tail end comprising said guide passage and said guide passage consisting of an eyelet, said tail end being shaped as a solid of revolution with a cut which is angularly in phase with a cut of said ballast mass.

7. The rig unit according to claim 1, wherein the guide rod extends from the rear end of the ballast mass and has a tail end opposite to the ballast mass, the tail end comprising the guide passage and the guide passage consisting of an eyelet.

8. The rig unit according to claim 7, wherein said eyelet is carried by an axial pin projecting from the tail end of said rod and mounted freely rotatable around its axis on said tail end.

9. The rig unit according to claim 7, wherein the float body carries an eyelet at a front end thereof constituting said attachment element for connecting the terminal line.

10. The rig unit according to claim 9, wherein the float body carries an eyelet for connecting the main line.

11. The rig unit according to claim 9, wherein said eyelet comprising said attachment element for connecting the terminal line is mounted at the end of a freely floating shank associated with the front end of the float body.

12. The rig unit according to claim 1, wherein the float body defines a compartment within which the hook and the auxiliary float connected to the terminal line remain contained during flight, and configured to release these elements upon impact with the water.

13. The rig unit according to claim 1, wherein the float body is in the form of an openable basket, for containing odorous bait.

14. The rig unit according to claim 1, wherein the float body has an axial tube through which a thread forming a loop projecting from the rear end of the float body is securable, to form said connecting eyelet of the main line.

\* \* \* \* \*